US009512643B1

(12) United States Patent
Keefe

(10) Patent No.: US 9,512,643 B1
(45) Date of Patent: Dec. 6, 2016

(54) DOOR UNLOCKING SYSTEMS AND METHODS

(71) Applicant: Josh Keefe, Russelville, AR (US)

(72) Inventor: Josh Keefe, Russelville, AR (US)

( * ) Notice: Subject to any disclaimer, the term of this patent is extended or adjusted under 35 U.S.C. 154(b) by 212 days.

(21) Appl. No.: 14/247,785

(22) Filed: Apr. 8, 2014

Related U.S. Application Data

(60) Provisional application No. 61/904,028, filed on Nov. 14, 2013.

(51) Int. Cl.
*H04Q 9/00* (2006.01)
*E05B 47/00* (2006.01)

(52) U.S. Cl.
CPC .................................... *E05B 47/00* (2013.01)

(58) Field of Classification Search
CPC ................ G07C 2009/00793; G07C 2009/04; G07C 9/00571; G07C 9/00309; G07C 2209/64; G07C 9/00111; G07C 9/00015; G07C 9/00103; G07C 9/00182; G07C 9/00007; G07C 2009/00769; G07C 9/00174; G07C 9/00658; E05B 47/00
USPC .................................................... 340/5.1-5.8
See application file for complete search history.

(56) References Cited

U.S. PATENT DOCUMENTS 5,486,812 A * 1/1996 Todd ...................... G08B 25/10 340/10.1
2005/0258936 A1* 11/2005 Ghabra ................ B60R 25/245 340/5.72
2007/0085657 A1* 4/2007 Ogino ..................... B60R 25/24 340/5.64
2008/0061933 A1* 3/2008 Ieda ...................... B60R 25/246 340/5.72
2008/0309566 A1* 12/2008 Russ ................. G07C 9/00309 343/703
2009/0096578 A1* 4/2009 Ogino .................. B60R 25/245 340/5.72
2009/0128329 A1* 5/2009 Sato ...................... B60R 25/245 340/568.1
2010/0015948 A1* 1/2010 Nagano ................ G08B 25/008 455/410
2010/0033298 A1* 2/2010 Kaihori ................. B60R 25/245 340/5.1
2011/0309922 A1* 12/2011 Ghabra .................. B60R 25/24 340/426.36
2012/0073338 A1* 3/2012 Mohla ................. E05B 47/0012 70/124
2012/0169487 A1* 7/2012 Poder .................... B60R 25/102 340/426.15
2012/0234058 A1* 9/2012 Neil .................. G07C 9/00571 70/91
(Continued)

*Primary Examiner* — Ojiako Nwugo
(74) *Attorney, Agent, or Firm* — R. Keith Harrison

(57) ABSTRACT

A door unlocking system includes a receiver adapted to detect wireless signals having a signal ID emitted by at least one mobile device to be carried by an authorized person; a microcontroller interfacing with the receiver, the microcontroller programmed to store a valid signal ID and compare the signal ID of the wireless signals to the valid signal ID; a lock operating mechanism interfacing with the microcontroller; and a door lock interfacing with the lock operating mechanism, the microcontroller programmed to unlock the door lock via the lock operating mechanism when the signal ID of the wireless signals corresponds to the valid signal ID. A door unlocking method is also disclosed.

21 Claims, 15 Drawing Sheets

(56) References Cited

U.S. PATENT DOCUMENTS

| | | | | | |
|---|---|---|---|---|---|
| 2013/0237193 | A1* | 9/2013 | Dumas | G07C 9/00571 | 455/414.1 |
| 2014/0020437 | A1* | 1/2014 | Bliding | E05B 49/00 | 70/283.1 |
| 2014/0077929 | A1* | 3/2014 | Dumas | G07C 9/00571 | 340/5.61 |
| 2014/0229254 | A1* | 8/2014 | Dammous | G06Q 30/0251 | 705/14.19 |
| 2014/0300117 | A1* | 10/2014 | Scheffler | E05B 47/0012 | 292/336.3 |
| 2015/0314986 | A1* | 11/2015 | Schwarzentruber | B66B 1/461 | 340/5.51 |
| 2015/0332530 | A1* | 11/2015 | Kishita | B60R 25/245 | 70/256 |
| 2015/0360545 | A1* | 12/2015 | Nania | B60J 7/0573 | 296/223 |

* cited by examiner

DOOR UNLOCKING SYSTEMS AND METHODS

CROSS-REFERENCE TO RELATED APPLICATIONS

This application claims the benefit of U.S. provisional application No. 61/904,028, filed Nov. 14, 2013 and entitled DOOR UNLOCKING SYSTEM, which provisional application is incorporated by reference herein in its entirety.

FIELD

Illustrative embodiments of the disclosure generally relate to door unlocking systems and methods. More particularly, illustrative embodiments of the disclosure relate to door unlocking systems and methods which facilitate automatic, wireless and hands-free unlocking of a door via a secure transmission signal as an authorized person approaches the door.

BACKGROUND

Doors in enclosures such as houses and buildings are typically unlocked by an authorized person's insertion of a key or card into a lock on the door or entry of a numeric or alphanumeric access code into a keypad. In applications in which the authorized person is carrying one or more items, inadvertently misplaces the key or card or forgets the access code, however, entry of the person through the door becomes a challenge. Therefore, door unlocking systems and methods which facilitate automatic, wireless and hands-free unlocking of a door via a secure transmission signal as an authorized person approaches the door may be desirable for some applications.

SUMMARY

Illustrative embodiments of the disclosure are generally directed to a door locking and unlocking system which facilitates automatic, wireless and hands-free unlocking of a door via a secure transmission signal as an authorized person approaches the door. An illustrative embodiment of the door unlocking system includes a receiver adapted to detect wireless signals having a signal ID emitted by at least one mobile device to be carried by an authorized person; a microcontroller interfacing with the receiver, the microcontroller programmed to store a valid signal ID and compare the signal ID of the wireless signals to the valid signal ID; a lock operating mechanism interfacing with the microcontroller; and a door lock interfacing with the lock operating mechanism, the microcontroller programmed to unlock the door lock via the lock operating mechanism when the signal ID of the wireless signals corresponds to the valid signal ID.

Illustrative embodiments of the disclosure are further generally directed to a door locking and unlocking method for locking and unlocking a door. An illustrative embodiment of the method includes detecting wireless signals emitted by at least one mobile device, the wireless signals having a signal ID; comparing the signal ID of the wireless signals to a valid signal ID; and unlocking the door if the signal ID of the wireless signals matches the valid signal ID.

BRIEF DESCRIPTION OF THE DRAWINGS

Illustrative embodiments of the disclosure will now be described, by way of example, with reference to the accompanying drawings, in which.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the claims. Moreover, the illustrative embodiments described herein are not exhaustive and embodiments or implementations other than those which are described herein and which fall within the scope of the appended claims are possible. Furthermore, there is no intention to be bound by any expressed or implied theory presented in the preceding technical field, background, brief summary or the following detailed description. As used herein, relative terms such as "front" and "rear" as used herein are intended for descriptive purposes only and are not necessarily intended to be construed in a limiting sense.

Figures 1, 2, 3, 4:
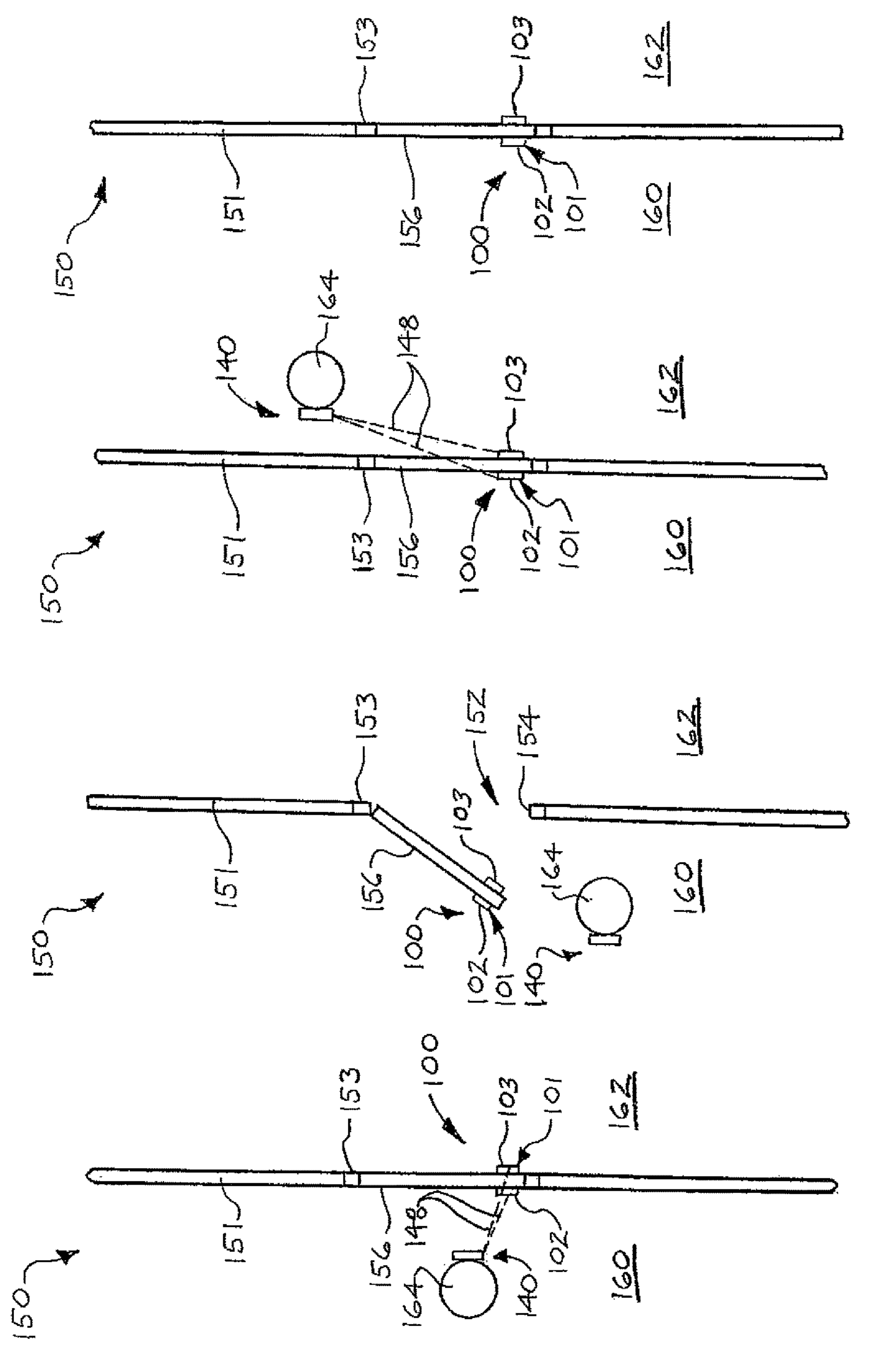
FIGS. 1-4 are top views, respectively, of a door mounted in a door opening in a wall, more particularly illustrating automatic, wireless and hands-free unlocking of the door, ingress of an authorized person through the door opening and automatic, wireless and hands-free locking of the door according to an illustrative embodiment of the door unlocking systems and methods.

Referring initially to FIGS. 1-4 of the drawings, an illustrative embodiment of a door unlocking system, hereinafter system, is generally indicated by reference numeral 100. In exemplary application, which will be hereinafter further described, the system 100 facilitates automatic, wireless and hands-free unlocking of at least one door 156 in an enclosure 150 by at least one person 164 having authorized access to the enclosure 150 as the authorized person 164 approaches the door 156 (FIGS. 1 and 2). The system 100 may further facilitate automatic, wireless and hands-free locking of the door 156 after the authorized person 164 has entered the enclosure 150 and closed the door 156 (FIGS. 3 and 4). The system 100 may be activated by wireless signals 148 which are emitted by a mobile device 140 that is carried by the authorized person 164. The enclosure 150 may include a house or building or at least one room within a house or building, for example and without limitation. The door 156 may be hinged to an interior or exterior wall 151 of the enclosure 150 for selective opening and closing a door opening 152 (FIG. 2) in the wall 151. Alternatively, the door 156 may be a sliding door known by those skilled in the art. In some applications, the door 156 may be mounted in a door frame 153 which frames the door opening 152. The door 156 controls access of the authorized person 164 from an enclosure exterior 160, through the door opening 152 to an enclosure interior 162.

As further illustrated in FIGS. 1-4, in some embodiments, the system 100 may include at least one system housing 101 which may contain at least some of the functional components of the system 100, which will be hereinafter described. The system housing 101 may include an outside housing portion 102 which faces the enclosure exterior 160 and an inside housing portion 103 which faces the enclosure interior 162 when the door 156 is closed in the door opening 152.

Figure 5:
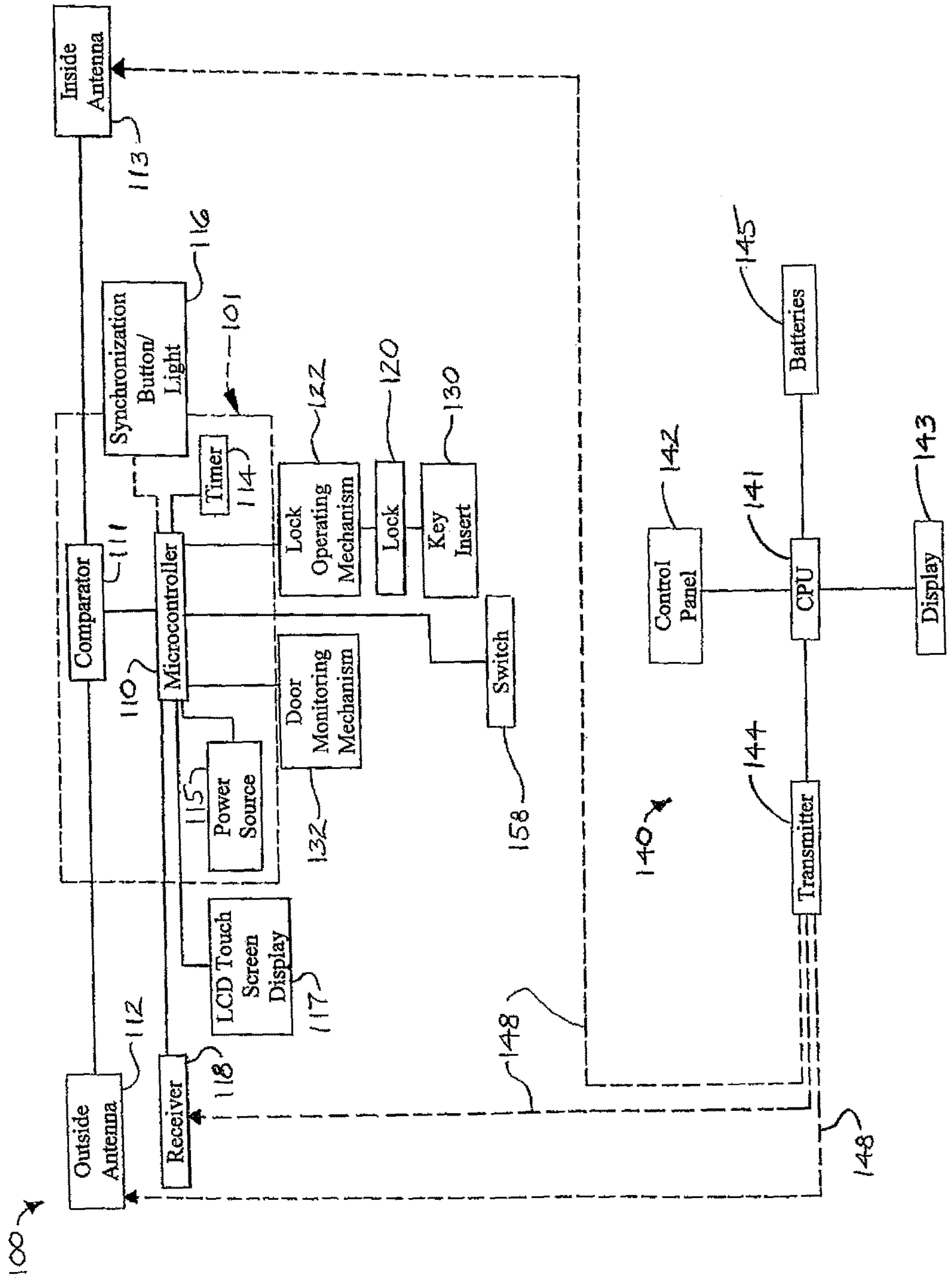
FIG. 5 is a block diagram of an illustrative door unlocking system.

Referring next to FIG. 5 of the drawings, the system 100 may include a microcontroller 110. The microcontroller 110 is programmed to process data inputs and implement at least some of the various functions of the system 100, which will be hereinafter described. The microcontroller 110 is programmed to store a valid signal ID for the wireless signals 148 which are emitted by a mobile device 140 of at least one authorized person 164. A receiver 118 may interface with the microcontroller 110. The receiver 118 is adapted to detect the wireless signals 148 emitted by at least one mobile device 140 which is carried or worn by at least one authorized person 164. The wireless signals 148 carry a signal ID such as a Bluetooth ID which is unique to each mobile device 140, as is known by those skilled in the art. The receiver 118 may be adapted to transmit data which indicates the signal ID of the wireless signals 148 to the microcontroller 110, which is programmed to compare the stored signal ID to the signal ID of the wireless signals 148 and validate the signal ID of the wireless signals 148 emitted by the mobile device 140 of an authorized person 164. The microcontroller 110 is programmed to invalidate the signal ID of the wireless signals 148 which are emitted by the mobile devices 140 of persons who do not have authorized access to the enclosure 150. The microcontroller 110 is further programmed to unlock the door 156 in the event that the signal ID of the wireless signals 148 is validated. The microcontroller 110 is programmed to maintain the door 156 in a locked configuration in the event that the signal ID of the wireless signals 148 is invalidated.

A comparator 111 interfaces with the microcontroller 110. An outside antenna 112 and an inside antenna 113 interface with the comparator 111. The outside antenna 112 and the inside antenna 113 are adapted to detect the wireless signals 148 emitted by the mobile device 140. The inside antenna 113 may include a dielectric barrier (not illustrated) to even out the signal strengths received by both antennas irrespective of antenna position. The comparator 111 is adapted to compare the relative strengths of the wireless signals 148 detected by the outside antenna 112 and the inside antenna 113 and transmit this relative signal strength comparison to the microcontroller 110. Based on the relative signal strengths of the wireless signals 148 received by the outside antenna 112 and the inside antenna 113, the microcontroller 110 has the capability to determine whether the authorized person 164 is located on the side of the door 156 which corresponds to the enclosure exterior 160 or the enclosure interior 162. A timer 114 may interface with the microcontroller 110. Based on the relative signal strength comparison from the comparator 111 and the elapsed time input from the timer 114, the microcontroller 110 may have the capacity to determine whether the authorized person 164 is moving toward or away from the door 156 on the enclosure exterior 160 or the enclosure interior 162 side of the door 156 according to whether the signal strength increases or decreases over time.

Figure 8:
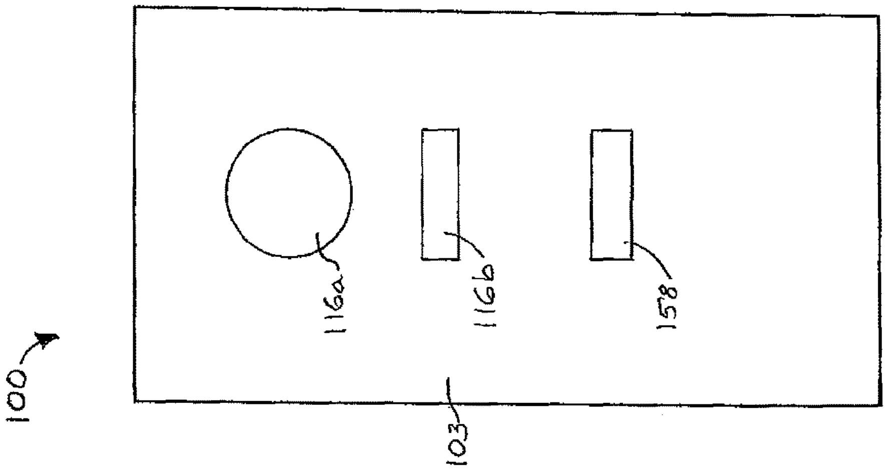
FIG. 8 is an exemplary interior door view of an illustrative door unlocking system.

A power source 115 interfaces with the microcontroller 110. The power source 115 may include a standard dedicated 120-volt power source which is derived from the electrical system of the enclosure 150 and/or at least one battery or battery pack (not illustrated). In some embodiments, the power source 115 may include at least one solar panel 115*a* (FIG. 7) which is electrically connected to the battery or battery pack for re-charging purposes. In some embodiments, a synchronization button and indicator light 116 may interface with the microcontroller 110. As used herein, "light" means a person notification that may relay through a device itself or may be sent to a person's phone for notification through an audio, visual and/or vibrational alarm. The synchronization button and indicator light 116 may include a synchronization button 116*a* and a synchronization light 116*b* (FIG. 8). The synchronization button 116*a* may be depressed to synchronize the microcontroller 110 to all mobile devices 140 the wireless signals 148 of which the receiver 118 is within range. The synchronization light 116*b* may be adapted to indicate successful synchronization of the mobile devices 140 such as in a manner which will be hereinafter described.

In some embodiments, an LCD touch screen display 117 may interface with the microcontroller 110. The LCD touch screen display 117 may provide an alternative method of synchronizing the microcontroller 110 to the mobile device or devices 140 such as in a manner which will be hereinafter described.

As further illustrated in FIG. 5, the door 156 (FIGS. 1-4) is fitted with a door lock 120 which is operable to selectively secure and lock the door 156 in the closed position in the door opening 152. The door lock 120 may include any type of locking mechanism which is operable to selectively lock and unlock the door 156 in the door opening 152 according to the knowledge of those skilled in the art. In some applications, for example and without limitation, the door lock 120 may include a deadbolt lock which may have a standard or conventional deadbolt lock design. In some applications, the door lock 120 may include a lockable door handle (not illustrated) which may have a standard or conventional design and is normally manipulated either manually from the inside or using a key or card (not illustrated) from the outside to selectively unlock the door lock 120 and open and close the door 156. A lock operating mechanism 122 interfaces with the microcontroller 110. The lock operating mechanism 122 mechanically engages the door lock 120 to facilitate wireless locking and unlocking of the door lock 120 in implementation of the system 100, as will be hereinafter described. In some embodiments, a key insert 130 may interface with the door lock 120 to facilitate selective manual unlocking and locking of the door lock 120 such as in the case of a power failure which may render the system 100 incapable of wireless operation, for example.

In some embodiments, a door monitoring mechanism 132 may interface with the microcontroller 110. The door monitoring mechanism 132 may be adapted to monitor the open or ajar and closed positions of the door 156 in the door opening 152 and transmit data which indicates the open or closed position of the door 156 to the microcontroller 110. The microcontroller 110 may be programmed to prevent locking of the door lock 120 via the lock operating mechanism 122 in the event that the door monitoring mechanism 132 indicates an open or ajar position of the door 156.

In some embodiments, a switch 158 may interface with the microcontroller 110. As used herein, "switch" means a mechanical button or person-defined change in embedded software or through a Bluetooth link. The switch 110 may enable an authorized person 164 to selectively turn the wireless signal-detecting and door-unlocking function of the system 100 on and off from the enclosure interior 162.

The mobile device 140 may include any type of portable device which is capable of being worn or carried by the authorized person 164 and emits wireless signals 148 that communicate with the system 100. Examples of mobile devices 140 which are suitable for the purpose include but are not limited to smart phones and tablets which emit wireless signals 148 that encode a signal ID such as a Bluetooth ID. The mobile device 140 may be conventional and generally includes a CPU (Central Processing Unit) 141 and a control panel 142, a display 143, a transmitter 144 and at least one battery 145 which interface with the CPU 141.

The microcontroller 110 and other components of the system 100 may be mounted on a circuit board (not illustrated). For example and without limitation, in some embodiments, a Printed Circuit Board (PCB) may support the microcontroller 110 and other components such as the comparator 111 and the timer 114. The circuit board may be contained in the system housing 101. The outside antenna 112 and the inside antenna 113 may be provided on the interior or the exterior of the outside housing portion 102 and the inside housing portion 103, respectively, of the system housing 101. In some embodiments, the outside antenna 112 and the inside antenna 113 may be placed on the respective exterior and interior of the wall 151 or door 156. In alternative embodiments, the outside antenna 112 and the inside antenna 113 may be placed on any other suitable structure on the enclosure exterior 160 and the enclosure interior 162, respectively, of the enclosure 150.

Figure 7:
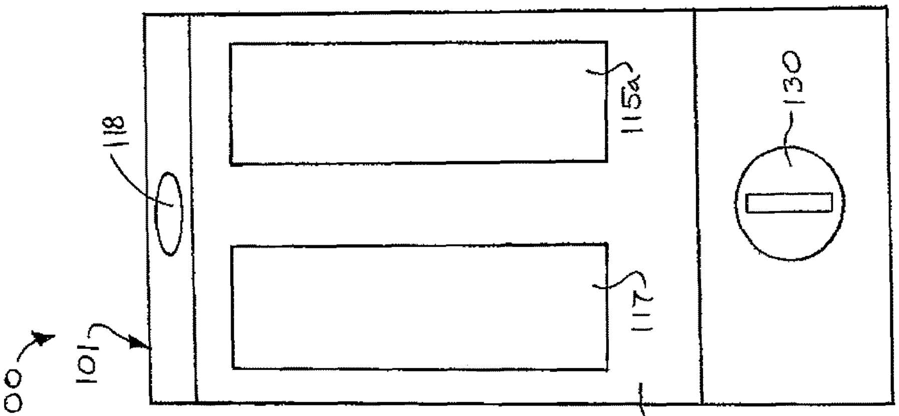
FIG. 7 is an exemplary exterior door view of an illustrative door unlocking system.
Figure 6:
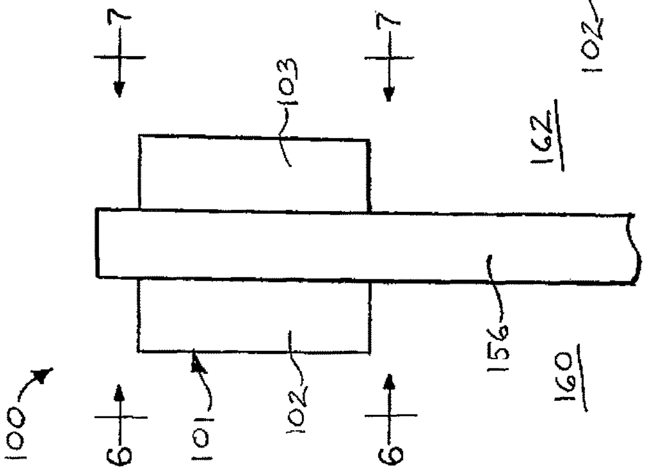
FIG. 6 is a top view of an illustrative door unlocking system mounted on a door (partially in section)

Referring next to FIGS. 6-8 of the drawings, in exemplary application of the system 100, which will be hereinafter described, the system housing 101 may be mounted on the door 156 with the outside housing portion 102 facing the enclosure exterior 160 and the inside housing portion 103 facing the enclosure interior 162 of the enclosure 150. FIG. 7 illustrates an exemplary layout of components on the outside housing portion 102. The receiver 118, the LCD touch screen display 117, the solar panel 115*a* and the key insert 130 may be provided on the outside housing portion 102 such that these components are readily accessible to the authorized person 164 from the enclosure exterior 160 of the enclosure 150. FIG. 8 illustrates an exemplary layout of components on the inside housing portion 103. The synchronization button 116*a*, the synchronization light 116*b* and the switch 158 may be provided on the inside housing portion 103 such that these components are readily accessible and visible to the authorized person 164 from the enclosure interior 162 of the enclosure 150.

Figure 9:
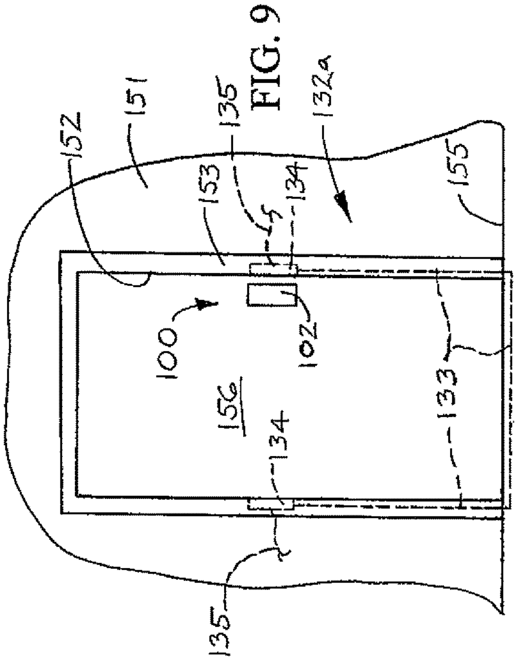
FIG. 9 is an exterior view of a closed door, with an illustrative door unlocking system mounted on the door and more particularly illustrating an exemplary door monitoring mechanism in monitoring the closed position of the door.
Figure 10:
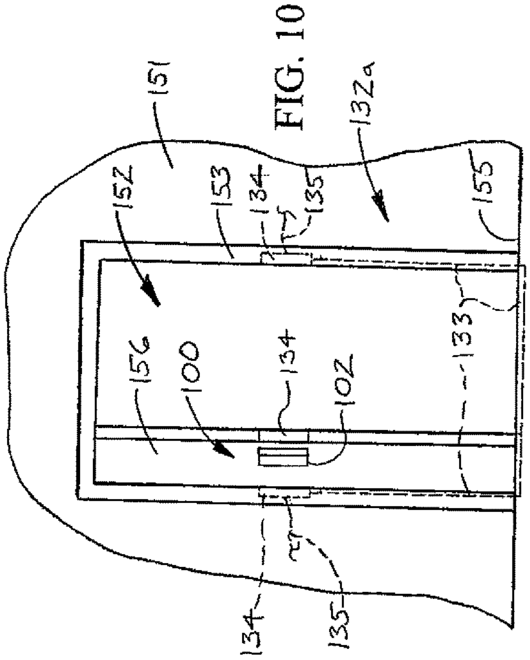
FIG. 10 is an exterior view of the door illustrated in FIG. 9 in an open position, with an illustrative door unlocking system mounted on the door and more particularly illustrating the exemplary door monitoring mechanism in detecting the open position of the door.

Referring next to FIGS. 9 and 10 of the drawings, an exemplary door monitoring mechanism 132*a* of an illustrative embodiment of the system 100 includes a generally U-shaped door frame contact element 133 which extends along both sides of the doorframe 153 and a portion of the floor 155 of the enclosure 150 which lies within the doorframe 153. A pair of door contact elements 134 is provided on opposite edges of the door 156. The door contact elements 134 may be electrically connected to the microcontroller 110 (FIG. 5) such as via contact wiring 135. When the door 156 is closed in the door opening 152, as illustrated in FIG. 9, the door contact elements 134 are disposed in electrical contact with each other through the door frame contact element 133. When the door 156 is open or ajar, as illustrated in FIG. 10, electrical contact between the door frame contact element 133 and at least one of the door contact elements 134 is broken, signaling the open or ajar position of the door 156 to the microcontroller 110.

Figure 11:
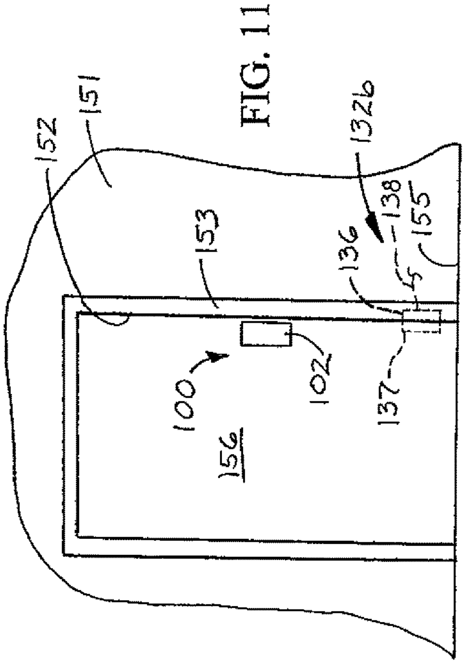
FIG. 11 is an exterior view of a closed door, with an illustrative door unlocking system mounted on the door and more particularly illustrating an alternative exemplary door monitoring mechanism in monitoring the closed position of the door.
Figure 12:
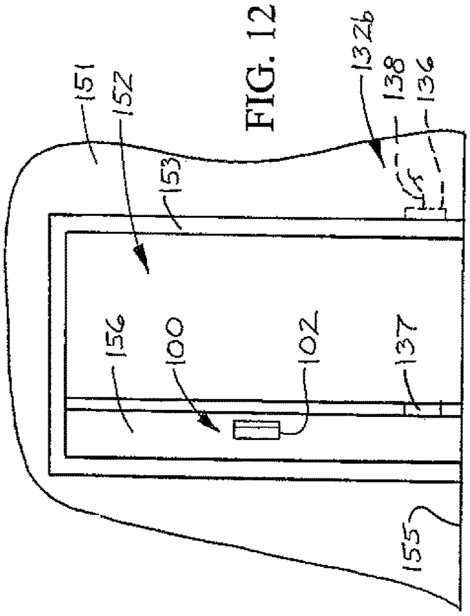
FIG. 12 is an exterior view of the door illustrated in FIG. 11 in an open position, with an illustrative door unlocking system mounted on the door and more particularly illustrating the alternative exemplary door monitoring mechanism in detecting the closed position of the door.

Referring next to FIGS. 11 and 12 of the drawings, an alternative exemplary door monitoring mechanism 132*b* of an illustrative embodiment of the system 100 includes a magnetic door frame contact element 136 which is provided on the door frame 153 inside the door facing 154 of the door opening 152. The magnetic door frame contact element 136 may be electrically connected to the microcontroller 110 (FIG. 5) such as via contact wiring 138. A magnetic door contact element 137 is provided on the outer edge of the door 156. As illustrated in FIG. 11, when the door 156 is closed, the door contact element 137 magnetically interfaces with the door frame contact element 136. When the door 156 is open, as illustrated in FIG. 12, magnetic contact between the door contact element 137 and the door frame contact element 136 is broken, signaling the open or ajar position of the door 156 to the microcontroller 110.

Figure 13:
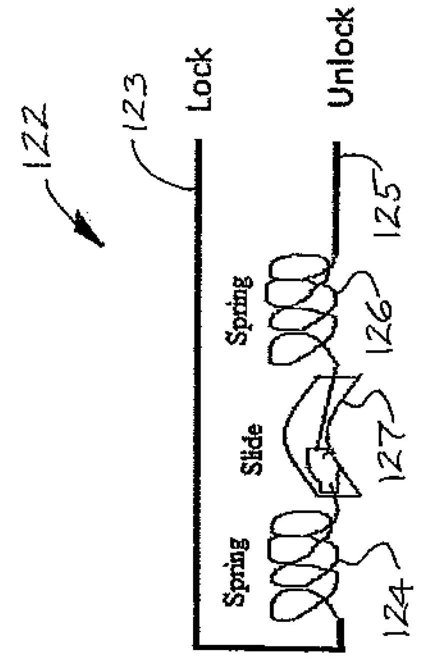
FIG. 13 is a schematic block diagram of an exemplary lock operating mechanism which is suitable for locking and unlocking a door in implementation of an illustrative door unlocking system.

Referring next to FIG. 13 of the drawings, an exemplary lock operating mechanism 122 of an illustrative embodiment of the system 100 includes a locking member 123 and an unlocking member 125 which mechanically engage the door lock 120 (FIG. 5) to lock and unlock, respectively, the door lock 120. A locking spring 124 interfaces with the microcontroller 110 (FIG. 5) and mechanically engages the locking member 123. An unlocking spring 126 interfaces with the microcontroller 110 and mechanically engages the unlocking member 125. The locking spring 124 and the unlocking spring 126 slidably engage a slide 127 which is positioned there between. Accordingly, in the event that the microcontroller 110 energizes the locking spring 124, the locking spring 124 retracts and causes the locking member 123 to actuate the door lock 120 to the locked position. Conversely, in the event that the microcontroller 110 energizes the unlocking spring 126, the unlocking spring 126 contracts and causes the unlocking member 125 to actuate the door lock 120 to the unlocked position.

An alternative exemplary lock operating mechanism 122 may include a solenoid (not illustrated) which interfaces with the microcontroller 110. A locking mechanism (not illustrated) engages the actuating mechanism (not illustrated) of the door lock 120. The locking mechanism is surrounded by an inductor. When the solenoid is energized, the resultant magnetic flux causes a ferromagnetic coating on the locking mechanism to move in the lock or unlock direction, operating the actuating mechanism to actuate the door lock 120 to the locking position or the unlocking position.

In exemplary application of the system 100, the microcontroller 110 is synchronized to the wireless signals 148 of at least one mobile device 140 which is carried by at least one authorized person 164. In some applications, the system 100 may be sold with a unique serial number which is referenced by a consumer upon online registration of the system 100. The serial number of the system 100 may include or correspond to a unique signal ID such as a Bluetooth ID which is stored in the memory of the microcontroller 110. The signal ID for the system 100 may be copied to the mobile device 140 for actuation of the lock 120 in implementation of the system 100.

In some embodiments, the system 100 may include the synchronization button 116*a* and the synchronization light 116*b*, as was heretofore described with respect to FIGS. 5 and 8. The microcontroller 110 may be synchronized to the wireless signals 148 of the mobile device 140 by initially positioning the mobile device 140 such that the receiver 118 of the system 100 is within range of the wireless signals 148 of the mobile device 140. The synchronization button 116*a* is then depressed to synchronize the microcontroller 110 to the wireless signals 148 of the mobile device 140. At this step, the microcontroller 110 may be synchronized to all mobile devices 140 the wireless signals 148 of which the receiver 118 is within range. The synchronization light 116*b* may indicate when the synchronization process has been successfully completed. For example and without limitation, in some applications, the synchronization light 116*b* may blink as the synchronization button 116*a* is held in a depressed position. When synchronization has been successfully completed, the synchronization light 116*b* may stop blinking and extinguish or continuously illuminate, indicating successful synchronization.

In some applications, the system 100 and the door lock 120 may be sold or offered to a consumer as a set. Accordingly, the system 100 may include a numeric or alphanumeric PIN number. The consumer initially enters the PIN number on the LCD touch screen display 117 to unlock the display 117, allowing the person to access a MENU screen and select and enter a new PIN number. The microcontroller 110 may detect, via the receiver 118, the presence of all signal-emitting devices in the area including the mobile device 140 of the authorized person 164, and present all of the detected devices on the display 117 via the MENU screen. By touching the display 117, the authorized person 164 may then select his or her mobile device 140 for authorized access to the enclosure 150 through operation of the system 100. The authorized person 164 may also have the option of naming the signal ID of his or her mobile device 140 for easy reference. At any time, the authorized person 164 may enter the PIN number on the display 117 to access the MENU screen on the display 117. The authorized person 164 may be given the option to selectively add or delete signal IDs that correspond to the wireless signals 148 of different mobile devices 140 to authorize or deny authorized access of those mobile devices 140 to the enclosure 150 through operation of the system 100.

Upon successful synchronization the microcontroller 110, via the lock operating mechanism 122, maintains the door lock 120 in a locked configuration such that the door 156 is locked in the door opening 152. The microcontroller 110 constantly monitors any wireless signals 148 which may be detected by the receiver 118. The microcontroller 110 compares the signal ID of the detected wireless signals 148 to the stored and synchronized signal ID. In the event that an authorized person 164 approaches the door 156 with his or her mobile device 140 from the enclosure exterior 160, as illustrated in FIG. 1, the microcontroller 110 validates the signal ID of the wireless signals 148 emitted by the mobile device 140. The outside antenna 112 and the inside antenna 113 also detect the wireless signals 148 emitted by the mobile device 140 of the authorized person 164. Because the comparator 111 indicates that the strength of the wireless signals 148 is stronger at the outside antenna 112 than at the inside antenna 113, the microcontroller 110 determines that the authorized person 164 is located on the enclosure exterior 160. Based on the increasing signal strength at the outside antenna 112, the microcontroller 110 may determine that the authorized person 164 is moving toward the door 156 from the enclosure exterior 160. Thus, the microcontroller 110 causes the lock operating mechanism 122 to unlock the door lock 120 such that the authorized person 164 can open the door 156, as illustrated in FIG. 2, enter the enclosure interior 162 of the enclosure 150 and then close the door 156 (FIG. 3).

After the authorized person 164 has entered the enclosure interior 162 and closed the door 156, as illustrated in FIG. 3, the microcontroller 110 may utilize the signal strength comparison from the comparator 111 to determine that the authorized person 164 is now located in the enclosure interior 162. Based on the decreasing signal strength at the inside antenna 113, the microcontroller 110 may determine that the authorized person 164 is moving away from the door 156 in the enclosure interior 162 (FIG. 4). The microcontroller 110 may also receive input from the door monitoring mechanism 132 to determine whether the door 156 is closed or ajar. Thus, if the microcontroller 110 determines (1) that the authorized person 164 is in the enclosure interior 162; (2) that the door 156 is closed and not ajar; and (3) that the wireless signals 148 received by the receiver 118 have a valid signal ID, then the microcontroller 110 may cause the lock operating mechanism 122 to lock the door lock 120 behind the authorized person 164, as illustrated in FIG. 4. In the event that, responsive to input from the door monitoring mechanism 132, it determines that the door 156 is ajar, the microcontroller 110 may cause the lock operating mechanism 122 to maintain the door lock 120 in the unlocked position. The microcontroller 110 may continue to receive input from the comparator 111 and the timer 114 to monitor the position of the authorized person 164 within the enclosure interior 162 and maintain the door lock 120 in the locked position even when the authorized person 164 approaches the door 156 (FIG. 3).

The authorized person 164 may unlock the door 156 from the enclosure interior 162 by manually engaging the door lock 120 on the inside of the door 156. Alternatively, in some embodiments an unlock button (not illustrated) may interface with the microcontroller 110 and may be provided on the inside housing portion 103 (FIG. 8) of the system housing 101 or in some other location which is accessible to the authorized person 164 from the enclosure interior 162. The authorized person 164 may manually engage the unlock button to override the lock operating mechanism 122 and unlock the door lock 120, enabling the authorized person 164 to open the door 156 and exit the door opening 152 to the enclosure exterior 160. In some applications, the authorized person 164 may elect to disarm the wireless signal-detecting and door-unlocking function of the system 100 from the enclosure interior 162 by manipulation of the switch 158.

After the authorized person 164 exits the enclosure interior 162 to the enclosure exterior 160, the microcontroller 110 may continue to monitor the wireless signals 148 via the receiver 118 as well as the signal strength comparison via the outside antenna 112, the inside antenna 113 and the comparator 111. Based on the higher though weakening strength of the wireless signals 148 at the outside antenna 112 as compared to the inside antenna 113, in combination with the elapsed time input from the timer 114, the microcontroller 110 may determine that the authorized person 164 is moving away from the door 156 on the enclosure exterior 160. Therefore, the microcontroller 110 locks the door lock 120 via the lock operating mechanism 122 to prevent subsequent access of unauthorized persons through the door 156 to the enclosure interior 162.

In some embodiments, the solar panel 115*a* (FIG. 7) may provide a source of recharging electrical power to a battery or battery pack (not illustrated) which is part of the power source 115. In the event that the power source 115 fails to supply electrical power to the system 100, the door 156 can be selectively opened manually by inserting a key (not illustrated) in the key insert 130.

In some embodiments, any or all of the features of the system 100 may be utilized and controlled through a mobile application which is loaded on the mobile device 140. The mobile application may enable the authorized person 164 to set, establish and/or modify the operational parameters of the system 100 over person-defined variables. Accordingly, more flexibility in regards to debugging and/or updating certain parameters such as timers, actuation of auxiliaries, bypass of alarms and GPS location of the mobile device 140, for example and without limitation, may be attained for control and/or actuation of the system 100. Moreover, utilization of a mobile application may enable the system 100 to utilize person-defined inputs, thereby allowing customization of the system 100 to meet the individual needs of the authorized person 164 without hardware modifications.

Figure 14:
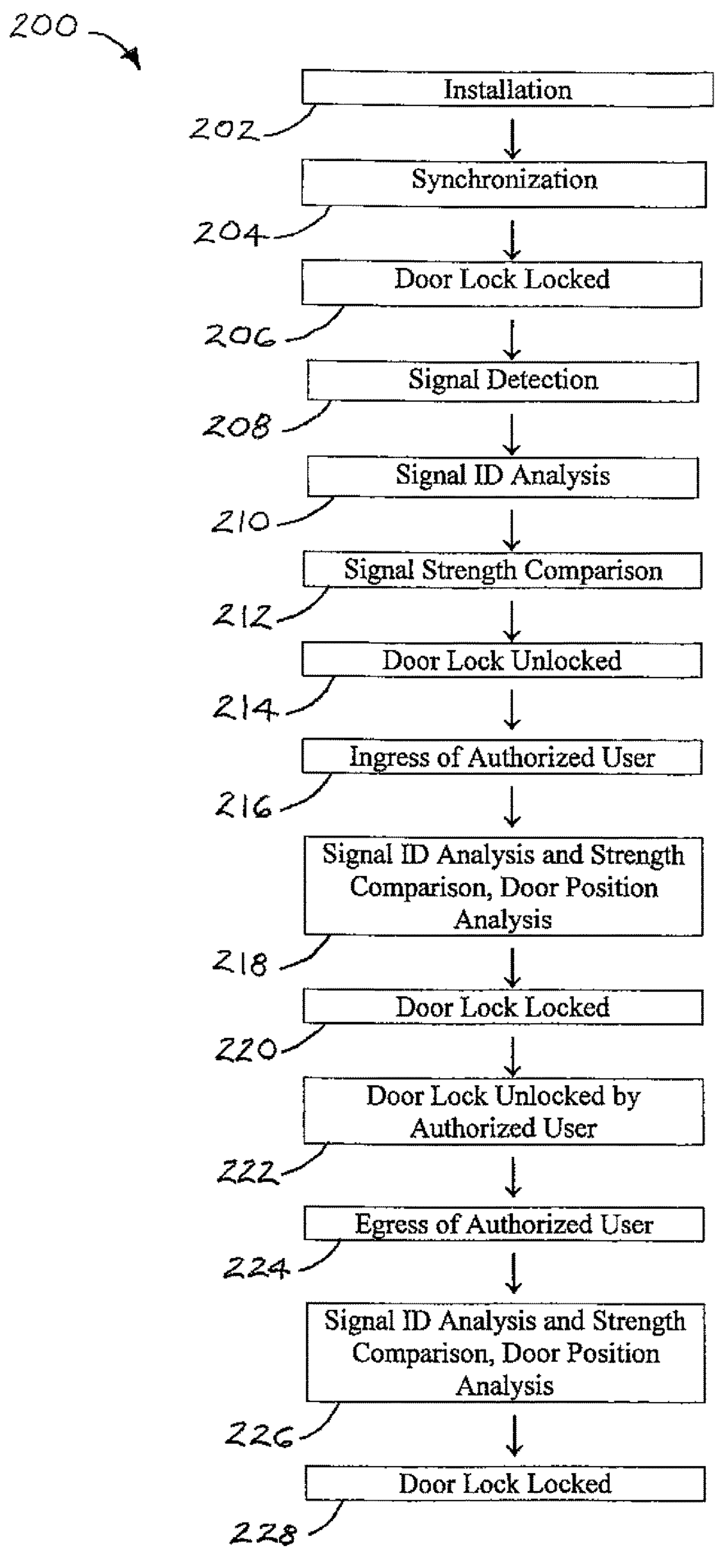
FIG. 14 is a flow diagram of an illustrative embodiment of a door unlocking method.

Referring next to FIG. 14 of the drawings, a flow diagram of an illustrative embodiment of a door unlock/lock method is generally indicated by reference numeral 200. In block 202, a door unlock/lock system is installed in at least one door in an enclosure between the enclosure exterior and the enclosure interior. In block 204, the system may be synchronized to wireless signals emitted by at least one mobile device carried by at least one authorized person. In block 206, a door lock on the door is locked. In block 208, wireless signals emitted by a mobile device are detected. In block 210, a signal ID (Bluetooth ID, for example) of the wireless signals is analyzed. The signal ID of the detected wireless signals may be compared to a valid signal ID which was stored via synchronization. In block 212, a comparison of the strength of the wireless signals between the enclosure interior and the enclosure exterior is made. In block 214, in the event that the signal ID of the wireless signals analyzed in block 210 is validated or matches the valid signal ID and the signal strength comparison made in block 212 indicates that the authorized person is at the enclosure exterior, the door lock on the door is unlocked and the authorized person opens the door.

In block 216, the authorized person enters the enclosure interior through the open door and then closes the door. In block 218, a signal ID analysis and strength comparison and a door position analysis may be made. In the event that the signal ID analysis validates the signal ID, the signal strength comparison indicates that the authorized person is in the enclosure interior and the door position analysis indicates that the door is closed, the door lock on the door may be locked (block 220).

In block 222, when he or she is ready to leave the enclosure interior, the unauthorized person unlocks the door lock and opens the door. In block 224, the authorized person exits the enclosure interior to the enclosure exterior through the door. In block 226, a signal ID analysis and strength comparison and a door position analysis may be made. In the event that the signal ID analysis validates the signal ID, the signal strength comparison indicates that the authorized person is in the enclosure exterior and the door position analysis indicates that the door is closed, the door lock on the door may be locked (block 228).

Figure 15:
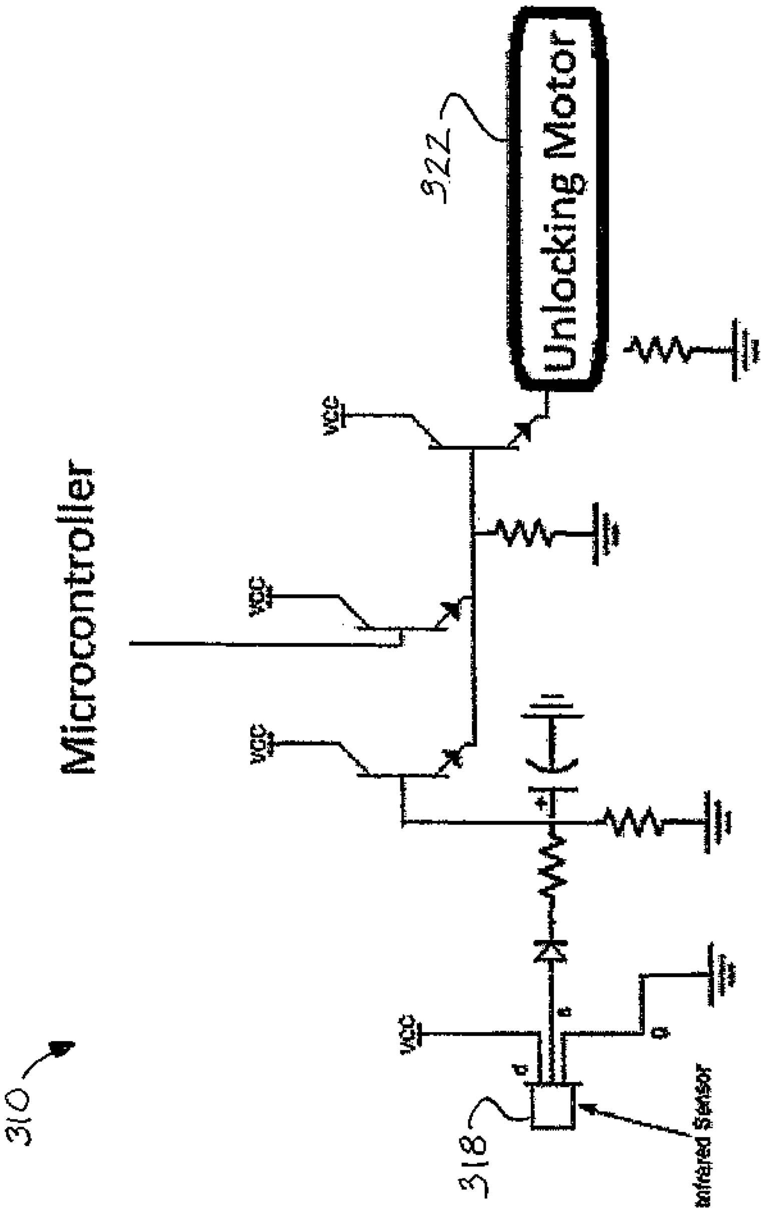
FIG. 15 is a schematic diagram of a microcontroller according to an alternative illustrative embodiment of the door unlocking systems and methods.
Figure 16:
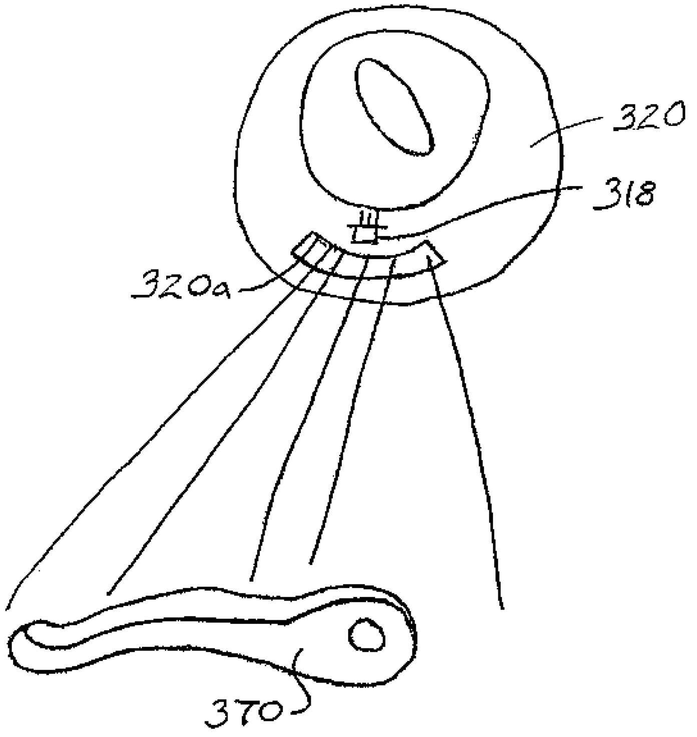
FIG. 16 is a perspective view of an exemplary lock of the alternative illustrative embodiment of the door unlocking systems and methods illustrated in FIG. 15.
Figure 17:
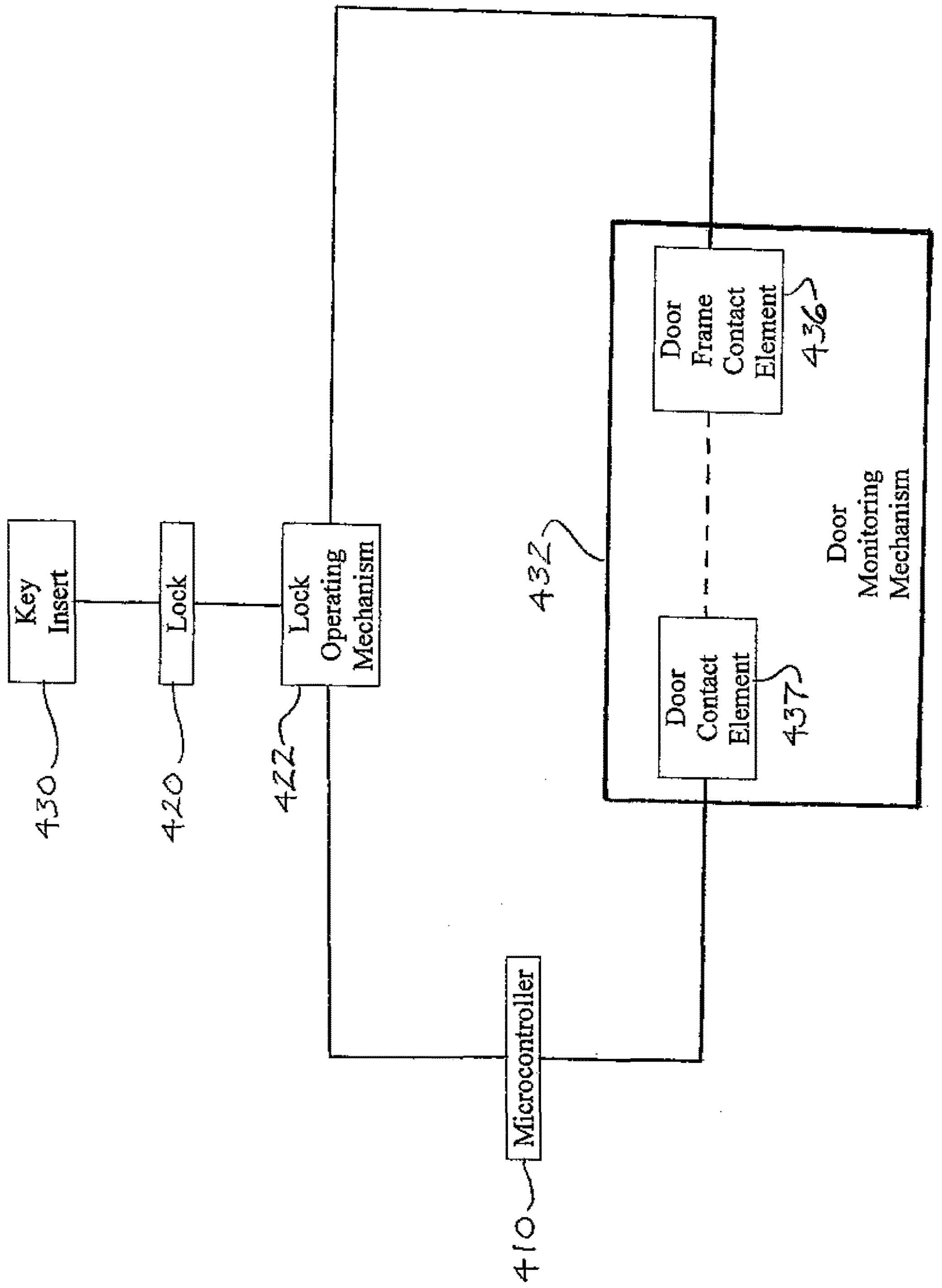
FIG. 17 is a block diagram which illustrates an alternative exemplary door monitoring mechanism in implementation of an illustrative door unlocking system.

Referring next to FIGS. 15 and 16 of the drawings, a microcontroller 310 according to an alternative illustrative embodiment of the door unlocking systems and methods is illustrated in FIG. 15. An infrared sensor 318 may interface with the microcontroller 310. A lock operating mechanism 322 may interface with the microcontroller 310 as was heretofore described with respect to FIG. 5. A lock 320 (FIG.

16) interfaces with the lock operating mechanism 322. The lock 320 may have an elongated viewing window 320*a* for the infrared sensor 318.

In implementation of the alternative door unlocking system, the door lock 320 may automatically unlock when the infrared sensor 318 detects a temperature change in the area adjacent to the door handle 370 on the inside of the door 156 (FIGS. 1-4). The temperature change may occur when the authorized person 164 approaches the door 156 from the enclosure interior 162, resulting in rising of the temperature which is sensed by the infrared sensor 318. Conversely, the door lock 320 may automatically lock when the infrared sensor 318 detects a lowering of temperature which results when the authorized person 164 walks away from the door 156. If the door 156 is unlocked and bypassed, then closed by grasping the handle 370 on the inside of the door 156, the door lock 320 may lock the door 156 or re-enable a door sensor or alarm which interfaces with the microcontroller 310, as may occur under circumstances in which the authorized person 164 returns to the door 156 after a brief exit.

In some embodiments, the infrared sensor 318 may be angled or positioned in the door lock 320 in such a manner as to view the inner surface of the door handle 370. This feature may be used by the system 100 to verify the orientation of the door handle 370 on the interior of the door 156 and perform an array of functions including but not limited to unlocking the door 156 and/or enabling a security system or door sensors (not illustrated). The door handle orientation as indicated by the infrared sensor 318 may also be used by the system 100 to prevent inadvertent unlocking of the door lock 320 when undesired.

In some embodiments, the door 156 may be adapted to automatically unlock by detection of the increased signal from the inside antenna 113 (FIG. 5). In some embodiments, the door 156 may be adapted to automatically unlock only if there is no authorized signal being detected on the exterior of the door 156 and/or there is no detection of an authorized person via an external peripheral device (such as a motion detector, for example and without limitation) which interfaces with the microcontroller 310.

Under circumstances in which a deadbolt and door knob or handle are sold as a unit with the door lock 120, the deadbolt may be automatically unlocked when the door knob or handle is rotated to open the door from the inside, in which the deadbolt and door knob will interface or communicate with each other to facilitate the unlocking operation, or a motion sensor with a narrow viewing range detects a temperature change in the area adjacent to the door handle 370. This would provide the authorized person 164 with the option of leaving the door 156 unlocked.

Referring again to FIG. 5, in some embodiments, the system 100 may be adapted to allow for a more flexible logic sequence which enables the authorized person 164 to make sporadic walks to and from the door 156 either on the enclosure exterior 160 or the enclosure interior 162. The comparator 111 interfaces with the microcontroller 110. The outside antenna 112 and the inside antenna 113 interface with the comparator 111. The outside antenna 112 and the inside antenna 113 are adapted to detect the wireless signals 148 emitted by the mobile device 140. The inside antenna 113 may include a dielectric barrier (not illustrated) to even out the signal strengths received by both antennas irrespective of antenna position. The comparator 111 may be adapted to compare the relative strengths of the wireless signals 148 detected by the outside antenna 112 and the inside antenna 113 and transmit this relative signal strength comparison to the microcontroller 110. Based on the relative signal strengths of the wireless signals 148 received by the outside antenna 112 and the inside antenna 113, the microcontroller 110 has the capability to determine whether the authorized person 164 is located on the side of the door 156 which corresponds to the enclosure exterior 160 or the enclosure interior 162. A timer 114 may interface with the microcontroller 110. Based on the relative signal strength comparison from the comparator 111 and the elapsed time input from the timer 114, the microcontroller 110 may have the capacity to determine whether the authorized person 164 is moving toward or away from the door 156 on the enclosure exterior 160 or the enclosure interior 162 side of the door 156 according to whether the signal strength increases or decreases over time.

The timer 114 may provide a means of determining the intent of the authorized person 164 to enter or exit the enclosure interior 162 based on the amount of time the authorized person 164 stands directly in front of either side of the door 156. This expedient will alleviate malfunction (unintentional unlocking of the door 156 if the authorized person 164 is moving slowly toward the door 156 or pacing back and forth by the door 156). Alternatively, the logic may leave the door 156 unlocked if the authorized person 164 is outside the door 156, until the authorized signal is no longer sensed by either the outside antenna 112 or the inside antenna 113.

Figure 23:
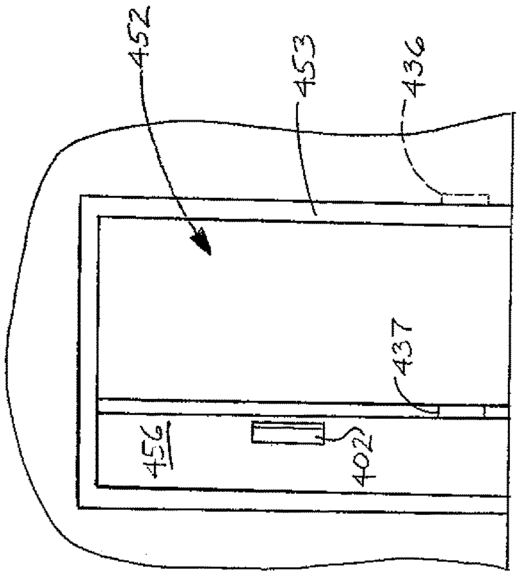
FIG. 23 is an exterior view of an open door, with the exemplary door monitoring mechanism illustrated in FIG. 17 monitoring the open position of the door.
Figure 25:
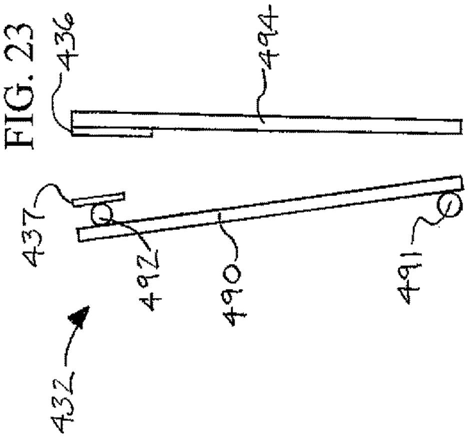
FIG. 25 is a side view of the exemplary door monitoring mechanism illustrated in FIG. 17, with the swing magnet fallen away from the stationary magnet to interrupt contact between the door frame contact element and the door contact element when the door is in the open position.
Figure 22:
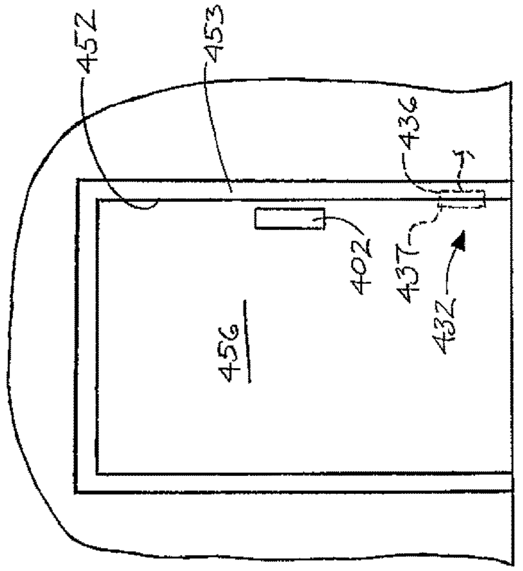
FIG. 22 is an exterior view of a closed door, with the exemplary door monitoring mechanism illustrated in FIG. 17 monitoring the closed position of the door.
Figure 24:
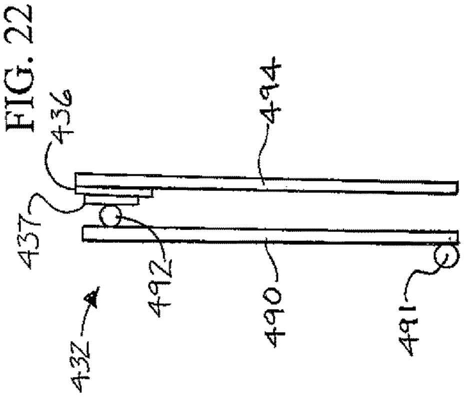
FIG. 24 is a side view of the exemplary door monitoring mechanism illustrated in FIG. 17, with the swing magnet attracted to the stationary magnet to establish contact between a door frame contact element and a door contact element when the door is in the closed position.

Referring next to FIGS. 17-25 of the drawings, an alternative exemplary door monitoring mechanism 432 which is suitable for implementation of an illustrative embodiment of the door unlocking systems and methods is shown. The door monitoring mechanism 432 may include a swing magnet 490 (FIGS. 18 and 21) which may be pivotally attached to the door 456 via a magnet pivot 491. A door contact element 437 may be mounted on the swing magnet 490 such as via a door contact support 492. A stationary magnet 494 may be mounted on the inside facing of the door frame 453. The stationary magnet 494 has a magnetic polarity which is opposite that of the swing magnet 490. A door frame contact element 436 may be provided on the stationary magnet 494. Accordingly, when the door 456 is closed, as illustrated in FIGS. 22 and 24, the swing magnet 490 pivots on the magnet pivot 491 toward the stationary magnet 494 such that the door contact element 437 contacts the door frame contact element 436. Therefore, the microcontroller 410 interprets the contact between the door contact element 437 and the door frame contact element 436 as the closed position of the door 456. When the door 456 is open, as illustrated in FIGS. 23 and 25, the swing magnet 490 falls away from the stationary magnet 494 and contact between the door frame contact element 436 and the door contact element 437 is broken. Therefore, the microcontroller 410 interprets the broken contact between the door contact element 437 and the door frame contact element 436 as the open position of the door 456.

Figure 19:
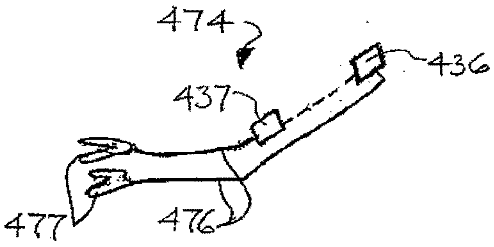
FIG. 19 is a perspective view of an exemplary contact connector which is suitable for the door monitoring mechanism illustrated in FIG. 17.
Figure 18:
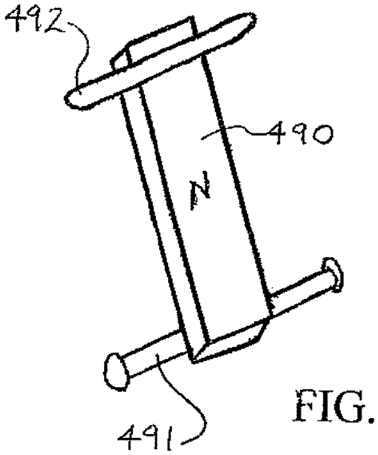
FIG. 18 is a perspective view of a pivoting swing magnet which is a component part of the exemplary door monitoring mechanism illustrated in FIG. 17.
Figure 20:
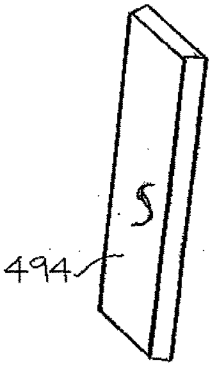
FIG. 20 is a perspective view of a stationary magnet which is a component part of the exemplary door monitoring mechanism illustrated in FIG. 17.
Figure 21:
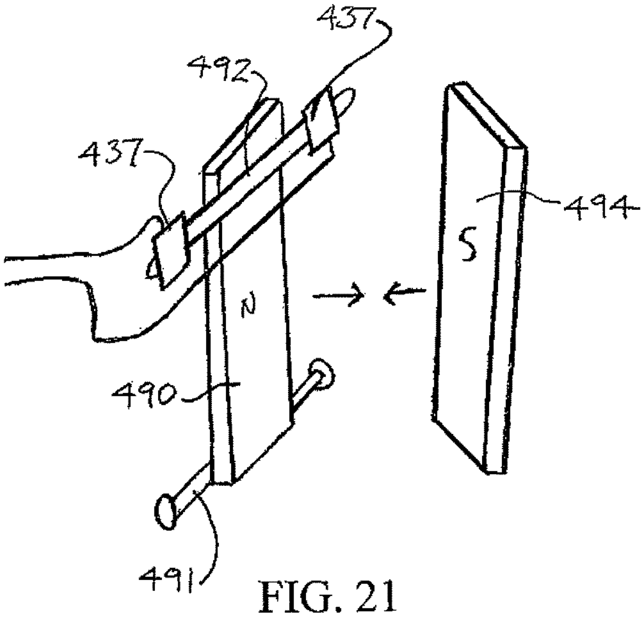
FIG. 21 is a perspective view of the exemplary door monitoring mechanism illustrated in FIG. 17, more particularly illustrating magnetic attraction of the swing magnet to the stationary magnet in the closed door position.

A perspective view of an exemplary contact connector 474 which is suitable for connecting the door monitoring mechanism 432 to the microcontroller 410 and/or the lock operating mechanism 422 is shown in FIG. 19. The contact connector 474 may include contact wiring 476 which is connected to the door frame contact element 436 and the door contact element 437. Clips 477 may terminate the contact wiring 476. The clips 477 may be adapted for connection to the microcontroller 410 and/or the lock operating mechanism 422. In other embodiments, the contact wiring 476 of the contact connector 474 may be hardwired to the microcontroller 410 and/or the lock operating mechanism 422.

Figure 26:
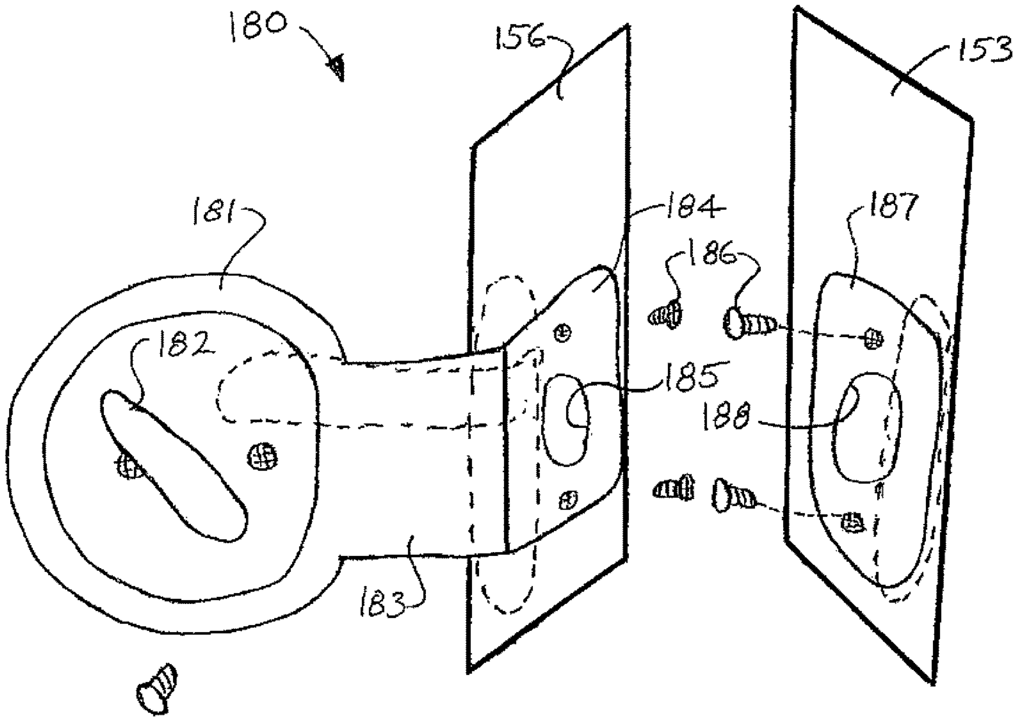
FIG. 26 is an exploded perspective view of an exemplary deadbolt lock assembly which is suitable for implementation of an illustrative embodiment of the door unlocking systems and methods.

Referring next to FIG. 26 of the drawings, an exemplary deadbolt lock assembly 180 which is suitable for implementation of an illustrative embodiment of the door unlocking systems and methods is shown. The deadbolt lock assembly 180 may include a deadbolt lock 181. The deadbolt lock 181 may include a lock knob 182 which engages a deadbolt lock bar (not illustrated) to facilitate locking and unlocking of the deadbolt lock 181 typically in the conventional manner. Additionally or alternatively, an automatic electronic locking mechanism, such as the lock operating mechanism 122 (FIG. 5) of the system 100, for example and without limitation, may operably engage the lock bar to lock and unlock the deadbolt lock 181 typically in the conventional manner. A lock extension flange 183 extends from the deadbolt lock 181. A lock insert flange 184 extends from the lock extension flange 183. The lock insert flange 184 may be disposed in generally perpendicular relationship to the lock extension flange 183. The lock insert flange 184 is adapted for attachment to the door facing of the door 156 such as by using fasteners 186 suitable for the purpose. A lock bar opening 185 extends through the lock insert flange 184.

A door frame flange 187 is mounted on the door facing of the door frame 153 such as by using fasteners 186. A lock bar opening 188 extends through the door frame flange 187. When the door 156 is completely closed in the door frame 153, the lock bar opening 185 in the lock insert flange 184 registers with the lock bar opening 188 in the door frame flange 187. Therefore, the deadbolt lock bar inserts through both the lock bar opening 185 in the lock insert flange 184 and the lock bar opening 188 in the door frame flange 187, locking the door 156. In the event that the door 156 is ajar in the door frame 153, the lock bar opening 185 in the lock insert flange 184 does not register with the lock bar opening 188 in the door frame flange 187. Therefore, the deadbolt lock bar cannot insert into the lock bar opening 188 and lock the door 156.

Figure 27:
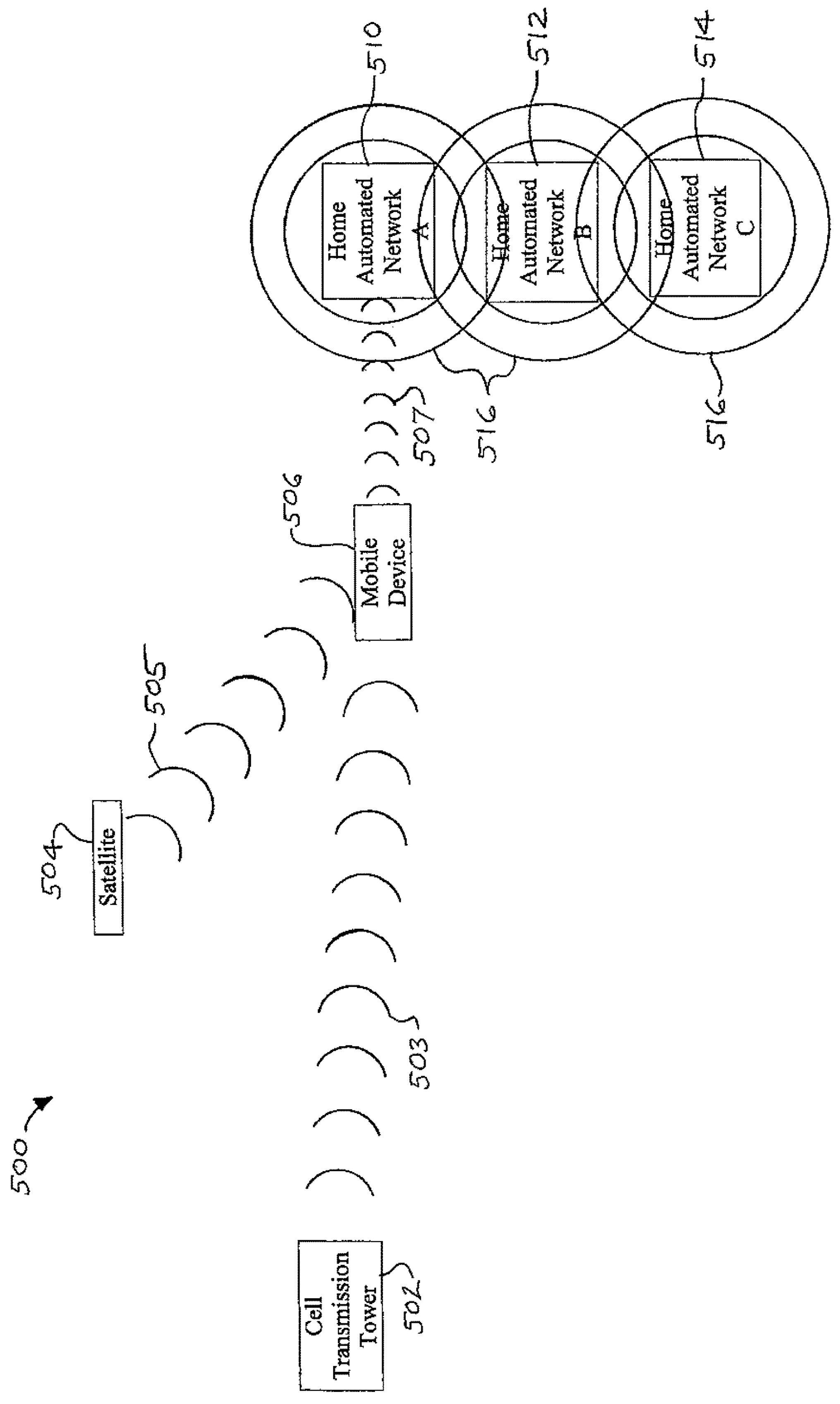
FIG. 27 is a block diagram of an illustrative embodiment of a home automated network actuating system.

Referring next to FIG. 27 of the drawings, an illustrative embodiment of a home automated network actuating system 500 is illustrated. The system 500 may include home automated networks 510, 512 and 514, respectively. Each home automated network 510, 512, 514 can be programmed to perform functions based on person preferences, such as turning on interior lights or enable/disable a security alarm, for example and without limitation, in a corresponding home or other building or enclosure as an authorized person who holds or wears a mobile device 506 approaches the enclosure or the door to the enclosure. A cell transmission tower 502 emits cell tower signals 503 and a satellite 504 emits satellite signals 505 which are received by the mobile device 506. Each home automated network 510, 512, 514 emits WiFi signals 516. As the mobile device 506 enters the range of the WiFi signals 516 of the home automated network 510, for example, the cell tower signals 503, the satellite signals 505 and the WiFi signals 516 can be used to triangulate the position of the mobile device 506 according to the knowledge of those skilled in the art. If the triangulation procedure indicates that the mobile device 506 is within range of the WiFi signals 516 emitted by the first home automated network 510, the home automated network 510 is activated and operates the lights, security alarm and/or other functions of the enclosure. The same applies with respect to the home automated network 512 and the home automated network 514. Moreover, the GPS capability of the mobile device 506 which is worn or held by the authorized person may be used in conjunction with signal strength from the WiFi signals 516 to aid in determining the location and direction of the authorized person relative to the enclosure.

Figure 28:
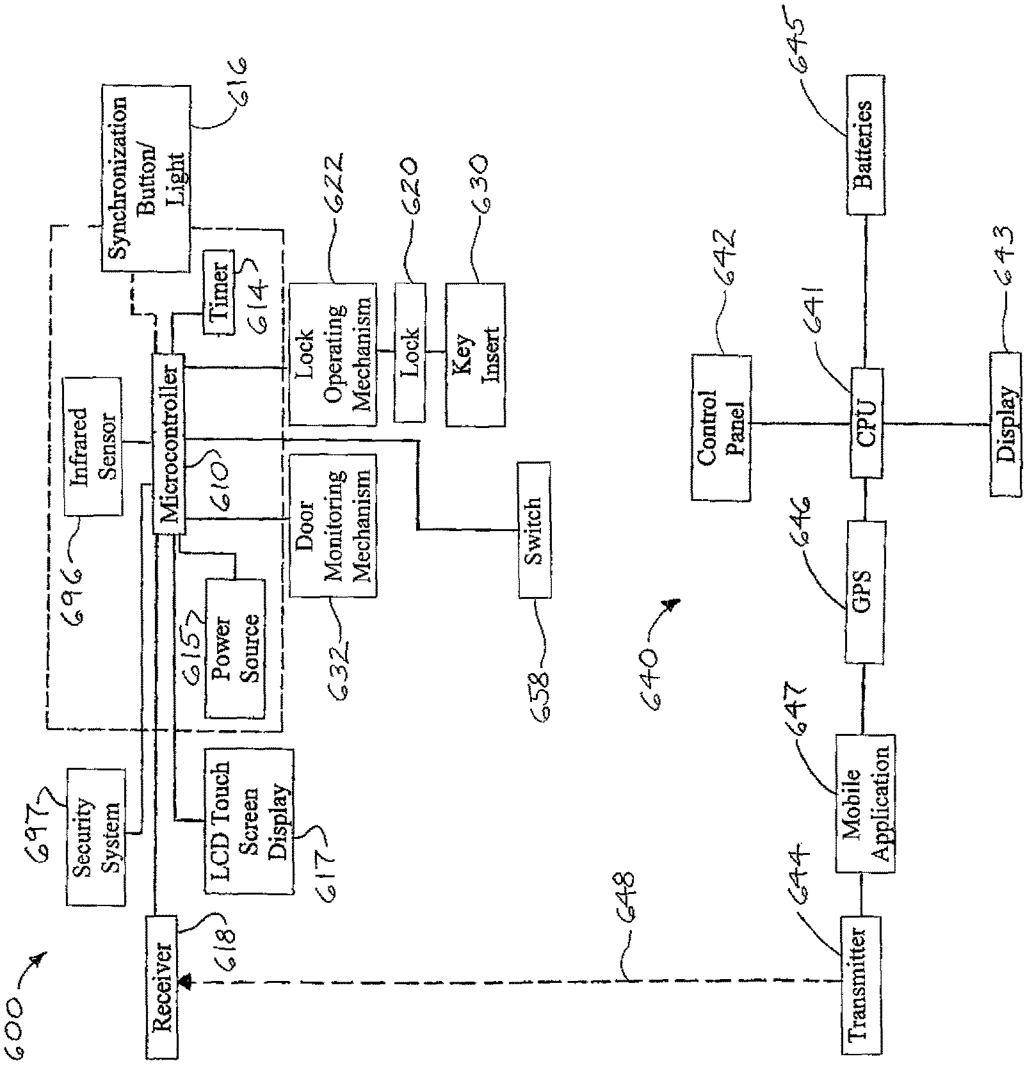
FIG. 28 is a block diagram of an alternative illustrative door unlocking system.

Referring next to FIG. 28 of the drawings, an alternative illustrative embodiment of the door unlocking system is generally indicated by reference numeral 600. In the system 600, elements which are analogous to the respective elements of the system 100 that was heretofore described with respect to FIGS. 1-13 are designated by the same numeral in the 600-699 series in FIG. 4. The mobile device 640 which is used with the system 100 may include a GPS (Global Positioning System) 646 which interfaces with the CPU 641. A transmitter 644 may interface with the CPU 641. A mobile application 647 which is loaded on the CPU 641 may be used to provide a person interface for establishing and controlling the various operational parameters of the system 600. An infrared sensor 696 and a home or business security system 697 may interface with the microcontroller 610.

The various components of the system 600 having like numbers to the components of the system 100 may have the same functions as those respective components in the system 600. The GPS coordinates of the door 156 (FIG. 1) may be programmed into the microcontroller 610. The GPS 646 provides continual input to the CPU 641 regarding the current GPS coordinate position of the mobile device 640. The transmitter 644 transmits an encoded wireless signal 648 which may have a signal ID for authentication purposes and indicates the position of the mobile device 640 to the receiver 618. The receiver 618, in turn, relays this position information to the microcontroller 610. The microcontroller 610 may compare a stored valid signal ID to the signal ID which is carried by the wireless signal 648 and implement the functions of the system 600 in the event that the signal ID carried by the wireless signal 648 matches the valid signal ID stored on the microcontroller 610. The microcontroller 610 determines the location or distance of the mobile device 640 to the door 156 based on the GPS coordinate position of the mobile device 640 received via the wireless signals 648 and the GPS coordinate position which was programmed into the microcontroller 610.

Under circumstances in which the authorized person 164 leaves the enclosure 150 (FIG. 1) through the door 156 and closes and walks away from the door 156, the GPS 646 of the mobile device 640 which is carried by the authorized person 164 detects and indicates movement of the mobile device 640 away from the door 156 to the microprocessor 610. After it detects via the GPS signal that the authorized person 164 has reached a predetermined distance from the door 156, the microcontroller 610 locks the lock 620 on the door 156 via the lock operating mechanism 622 and arms the security system 697. When the authorized person 164 later approaches the door 156 to the enclosure 150, the microprocessor 610 unlocks the lock 620 via the lock operating mechanism 622 and disarms the security system 697. The authorized person 164 can then enter the enclosure 150 by walking through the unlocked door 156.

After the authorized person 164 subsequently closes and then walks away from the door 156 on the inside of the enclosure 150, the microcontroller 610 may lock the lock 620 on the door 156 via the lock operating mechanism 622 and enable the door monitoring mechanism 632. If the authorized person 164 subsequently approaches the door 156 from inside the enclosure 150, the microcontroller 610 may unlock the door 156 and bypass the door monitoring mechanism 632 via the infrared sensor 696. The microcontroller 610 may subsequently automatically lock the lock 620 and re-enable the door monitoring mechanism 632 for the door 156 which was bypassed previously via one of the following: closing the door 156 from the inside side of the door 156 via the infrared sensor 696, detecting a system status change from the door open to the door closed position following a bypass for that door (door monitoring mechanism 632), detecting the mobile device 640 a distance from the enclosure 150 and thereby indicating that the authorized person 164 is leaving the enclosure 150 (mobile application 647).

Figure 29:
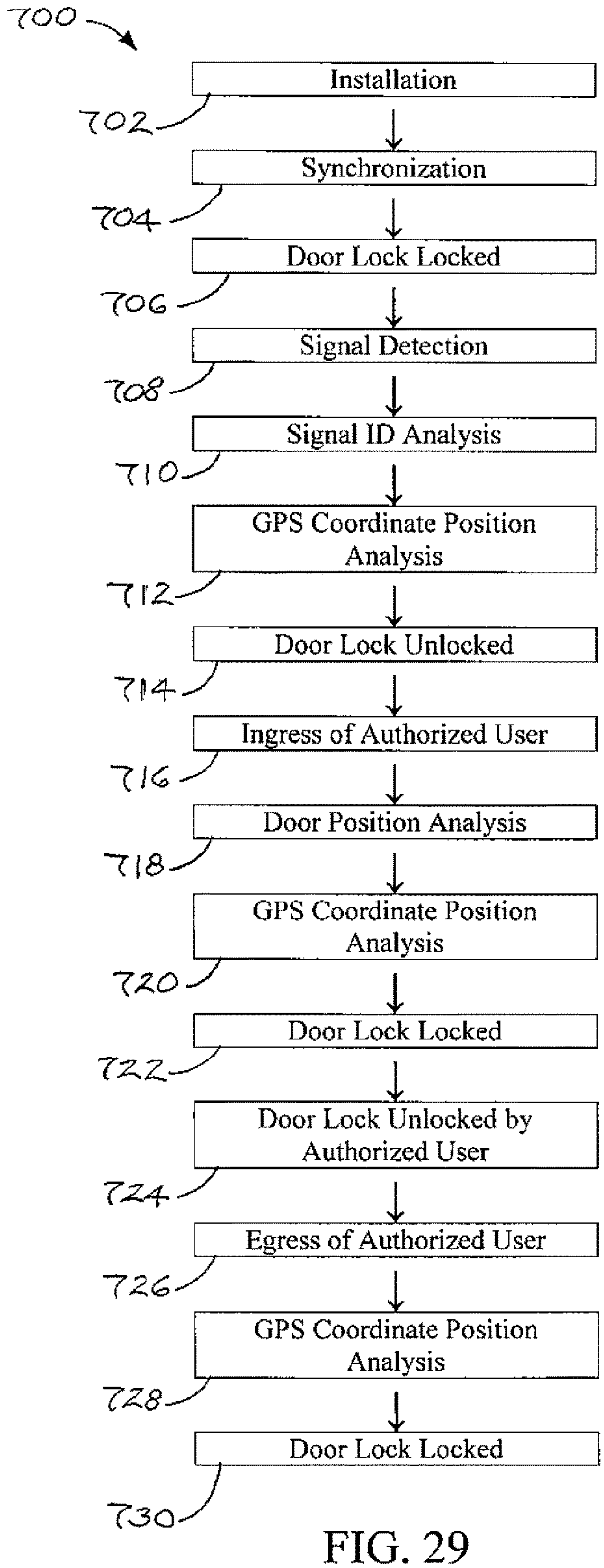
FIG. 29 is a flow diagram of an illustrative embodiment of a door lock/unlock method.

Referring next to FIG. 29 of the drawings, a flow diagram of an illustrative embodiment of a door unlock/lock method is generally indicated by reference numeral 700. In block 702, a door unlock/lock system is installed in at least one door in an enclosure between the enclosure exterior and the enclosure interior. In block 704, the system may be synchronized to wireless signals emitted by at least one mobile device carried by at least one authorized person. In block 706, a door lock on the door is locked. In block 708, wireless signals emitted by a mobile device are detected. In block 710, a signal ID (Bluetooth ID, for example) of the wireless signals is analyzed. The signal ID of the detected wireless signals may be compared to a valid signal ID which was stored via synchronization. In block 712, a GPS coordinate position analysis may be made to determine the GPS coordinates of the mobile device. In block 714, in the event that the GPS coordinate position of the mobile device as analyzed in block 710 is within a predetermined distance or range of the door of the enclosure, the door lock on the door is unlocked and the authorized person opens the door.

In block 716, the authorized person enters the enclosure interior through the open door and then closes the door. In block 718, a door position analysis may be made to determine whether the door is open, closed or ajar. In block 720, a GPS coordinate position analysis may be made to determine the UPS coordinates of the mobile device. In block 722, in the event that the door position analysis carried out in block 718 indicates that the door is closed and the GPS coordinate position of the mobile device as analyzed in block 720 is within a predetermined distance or range of the door of the enclosure, the door lock on the door is locked.

In block 724, when he or she is ready to leave the enclosure interior, the unauthorized person unlocks the door lock and opens the door. In block 726, the authorized person exits the enclosure interior to the enclosure exterior through the door. In block 728, a GPS coordinate position analysis may be made to determine the GPS coordinates of the mobile device. In block 730, in the event that the GPS coordinate position of the mobile device as analyzed in block 724 is outside a predetermined distance or range of the door of the enclosure, the door lock on the door is locked.

While the embodiments of the disclosure have been described above, it will be recognized and understood that various modifications can be made and the appended claims are intended to cover all such modifications which may fall within the spirit and scope of the disclosure.

What is claimed is:

1. A door locking and unlocking system, comprising:

a receiver adapted to detect wireless signals having a signal ID emitted by at least one mobile device to be carried by an authorized person;

a microcontroller interfacing with the receiver, the microcontroller programmed to store a valid signal ID and compare the signal ID of the wireless signals to the valid signal ID;

a lock operating mechanism interfacing with the microcontroller; and a door lock interfacing with the lock operating mechanism, the microcontroller programmed to automatically unlock the door lock via the lock operating mechanism when the signal ID of the wireless signals corresponds to the valid signal the door lock comprises a lockable door handle;

a comparator interfacing with the microcontroller;

an outside antenna and an inside antenna interfacing with the comparator, the outside antenna and the inside antenna adapted to detect the wireless signals emitted by the at least one mobile device and the comparator adapted to compare signal strengths of the wireless signals at the outside antenna relative to the inside antenna;

the microcontroller is configured to automatically unlock the door lock via the lock operating mechanism when the wireless signals as measured by the outside antenna are stronger than the wireless signals as measured by the inside antenna;

the microcontroller is configured to automatically lock the door lock via the lock operating mechanism when the wireless signals as measured by the inside antenna are stronger than the wireless signals as measured by the outside antenna; and an infrared sensor interfacing with the microcontroller and the lock operating mechanism, the infrared sensor automatically unlocks the door lock when the infrared sensor detects a rise in temperature in an area adjacent to the door handle and automatically locks the door lock when the infrared sensor detects a lowering of temperature around the area adjacent to the door handle.

2. The door locking and unlocking system of claim 1 further comprising a synchronization button interfacing with the microcontroller, the synchronization button adapted to synchronize the signal ID of the wireless signals emitted by the at least one mobile device with the microcontroller.

3. The door locking and unlocking system of claim 1 wherein the door lock comprises a deadbolt lock.

4. The door locking and unlocking system of claim 1 further comprising a timer interfacing with the microcontroller, and wherein the microcontroller is adapted to determine whether the signal strength of the wireless signals is increasing or decreasing over time as measured by the timer.

5. The door locking and unlocking system of claim 1 further comprising an LCD touch screen display interfacing with the microcontroller, the LCD touch screen display adapted to synchronize the microcontroller to the wireless signals.

6. A door locking and unlocking system, comprising:

a door;

a system housing carried by the door;

a receiver carried by the system housing, the receiver adapted to detect wireless signals having a signal ID emitted by at least one mobile device to be carried by an authorized person;

a microcontroller interfacing with the receiver, the microcontroller programmed to store a valid signal ID and compare the signal ID of the wireless signals to the valid signal ID;

a lock operating mechanism interfacing with the microcontroller;

a door lock interfacing with the lock operating mechanism, the microcontroller programmed to automatically unlock the door lock via the lock operating mechanism when the signal ID of the wireless signals corresponds to the valid signal the door lock comprises a lockable door handle;

a door monitoring mechanism carried by the door and interfacing with the microcontroller, the door monitoring mechanism adapted to monitor the open and closed positions of the door and transmit data indicating the open or closed position of the door to the microcontroller;

a comparator interfacing with the microcontroller;

an outside antenna and an inside antenna interfacing with the comparator, the outside antenna and the inside antenna adapted to detect the wireless signals emitted by the at least one mobile device and the comparator adapted to compare signal strengths of the wireless signals at the outside antenna relative to the inside antenna;

the microcontroller is configured to automatically unlock the door lock via the lock operating mechanism when the wireless signals as measured by the outside antenna are stronger than the wireless signals as measured by the inside antenna; and the microcontroller is configured to automatically lock the door lock via the lock operating mechanism when the wireless signals as measured by the inside antenna are stronger than the wireless signals as measured by the outside antenna; and an infrared sensor interfacing with the microcontroller and the lock operating mechanism, the infrared sensor automatically unlocks the door lock when the infrared sensor detects a rise in temperature in an area adjacent to the door handle and automatically locks the door lock when the infrared sensor detects a lowering of temperature in the area adjacent to the door handle.

7. The door locking and unlocking system of claim 6 wherein the door monitoring mechanism comprises a door frame contact element and a pair of door contact elements carried by the door and interfacing with the microcontroller, the door contact elements disposed in electrical contact with the door frame contact element when the door is in a closed position and at least one of the door contact elements disposed out of electrical contact with the door frame contact element when the door is in an open position.

8. The door locking and unlocking system of claim 6 wherein the door monitoring mechanism comprises a magnetic door frame contact element interfacing with the microcontroller and a magnetic door contact element carried by the door, the door contact element magnetically interfacing with the door frame contact element when the door is on a closed position and the door contact element disposed out of magnetic interaction with the door frame contact element when the door is in an open position.

9. The door locking and unlocking system of claim 6 wherein the door monitoring mechanism comprises a swing magnet pivotally carried by the door, a door contact element carried by the swing magnet, a stationary magnet having a magnetic polarity opposite a magnetic polarity of the swing magnet and a door frame contact element carried by the stationary magnet and interfacing with the microcontroller, the swing magnet pivots toward the stationary magnet and the door contact element contacts the door frame contact element when the door is in a closed position and the swing magnet pivots away from the stationary magnet and the door contact element disengages the door frame contact element when the door is in an open position.

10. The door locking and unlocking system of claim 6 further comprising a synchronization button interfacing with the microcontroller, the synchronization button adapted to synchronize the signal ID of the wireless signals emitted by the at least one mobile device with the microcontroller.

11. The door locking and unlocking system of claim 6 wherein the door lock comprises a deadbolt lock.

12. The door locking and unlocking system of claim 6 further comprising a timer interfacing with the microcontroller, and wherein the microcontroller is adapted to determine whether the signal strength of the wireless signals is increasing or decreasing over time as measured by the timer.

13. The door locking and unlocking system of claim 6 further comprising an LCD touch screen display interfacing with the microcontroller, the LCD touch screen display adapted to synchronize the microcontroller to the wireless signals.

14. A door locking and unlocking system, comprising:

at least one mobile device to be carried by an authorized person, the at least one mobile device including a central processing unit and a global positioning system and a transmitter interfacing with the central processing unit;

the transmitter adapted to transmit wireless signals having a signal ID and indicating the GPS coordinate position of the at least one mobile device;

a receiver adapted to detect the wireless signals emitted by at the least one mobile device;

a microcontroller interfacing with the receiver, the microcontroller programmed to store a valid signal ID and compare the signal ID of the wireless signals to the valid signal ID and monitor the GPS coordinate position of the at least one mobile device;

a lock operating mechanism interfacing with the microcontroller;

a door lock interfacing with the lock operating mechanism, the microcontroller programmed to unlock the door lock via the lock operating mechanism when the signal ID of the wireless signals corresponds to the valid signal ID and the at least one mobile device is within a predetermined distance of the receiver, the door lock comprises a lockable door handle;

a comparator interfacing with the microcontroller;

an outside antenna and an inside antenna interfacing with the comparator, the outside antenna and the inside antenna adapted to detect the wireless signals emitted by the at least one mobile device and the comparator adapted to compare signal strengths of the wireless signals at the outside antenna relative to the inside antenna;

the microcontroller is configured to automatically unlock the door lock via the lock operating mechanism when the wireless signals as measured by the outside antenna are stronger than the wireless signals as measured by the inside antenna; and the microcontroller is configured to automatically lock the door lock via the lock operating mechanism when the wireless signals as measured by the inside antenna are stronger than the wireless signals as measured by the outside antenna; and an infrared sensor interfacing with the microcontroller and the lock operating mechanism, the infrared sensor automatically unlocks the door lock when the infrared sensor detects a rise in temperature in an area adjacent to the door handle and automatically locks the door lock when the infrared sensor detects a lowering of temperature around the area adjacent to the door handle.

15. The door locking and unlocking system of claim 14 wherein the microcontroller is programmed to automatically lock the door lock via the lock operating mechanism when the at least one mobile device moves outside the predetermined distance from the receiver.

16. The door locking and unlocking system of claim 14 further comprising a security system interfacing with the microcontroller, and wherein the microcontroller is programmed to disarm the security system when the at least one mobile device is within a predetermined distance of the receiver and the microcontroller is programmed to arm the security system when the at least one mobile device is outside the predetermined distance from the receiver.

17. A door locking and unlocking method for locking and unlocking a door having a door lock, comprising:

detecting wireless signals emitted by at least one mobile device, the wireless signals having a signal ID;

comparing the signal ID of the wireless signals to a valid signal ID;

automatically unlocking the door if the signal ID of the wireless signals matches the valid signal ID;

comparing signal strengths of the wireless signals on an outside relative to an inside of the door;

automatically unlocking the door lock when the wireless signals outside the door are stronger than the wireless signals inside the door;

automatically locking the door lock when the wireless signals inside the door are stronger than the wireless signals outside the door;

automatically unlocking the door lock upon detecting a rise in temperature in an area adjacent to the door lock; and automatically unlocking the door lock when the infrared sensor detects a lowering of temperature in the area adjacent to the door lock.

18. The door locking and unlocking method of claim 17 further comprising determining whether the at least one mobile device is moving toward or away from the door according to whether the strengths of the wireless signals increases or decreases over time.

19. The door locking and unlocking method of claim 18 further comprising locking the door if the at least one mobile device is moving away from the door.

20. The door locking and unlocking method of claim 17 further comprising detecting GPS coordinate positions of the at least one mobile device, and unlocking the door if the at least one mobile device is within a predetermined distance from the door.

21. The door locking and unlocking method of claim 20 further comprising locking the door if the at least one mobile device is outside the predetermined distance from the door.

* * * * *